(12) United States Patent
Park (10) Patent No.: US 6,463,024 B1
(45) Date of Patent: Oct. 8, 2002

(54) METHOD FOR FORMATTING AN OPTICAL RECORDING MEDIUM

(75) Inventor: Yong Cheol Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/452,808

(22) Filed: Dec. 2, 1999

(30) Foreign Application Priority Data

Dec. 2, 1998 (KR) .......................................... 1998-52601

(51) Int. Cl.$^7$ ................................................. G11B 5/09
(52) U.S. Cl. .............................. 369/53.35; 369/53.15; 369/47.14
(58) Field of Search ........................ 369/53.15, 53.17, 369/53.24, 53.35, 53.36, 275.3, 47.14; 360/53; 386/95, 125; 714/5–8, 39–45, 710

(56) References Cited

U.S. PATENT DOCUMENTS 5,896,364 * 4/1999 Okazaki et al. .......... 369/275.3
6,189,014 * 2/2001 Nakashima et al. ......... 369/272
6,189,118 * 2/2001 Sasaki et al. ............ 369/44.17
6,205,099 * 3/2001 Sasaki et al. ............ 369/53.17

FOREIGN PATENT DOCUMENTS

KR 0012490 9/1996

* cited by examiner

Primary Examiner—Thang V. Tran
(74) Attorney, Agent, or Firm—Birch, Stewart, Kolasch & Birch, LLP

(57) ABSTRACT

A method for formatting an optical recording medium facilitates realtime recording. A continuity of the user area data is secured regardless of the manner of initializing by conducting slipping such that the user area is continuous. The method maintains a continuous user area during slipping replacement on an optical disk having the spare area assigned to the inner circumference, an optical disk having the spare area assigned to the outer circumference, and an optical disk having the spare area assigned both to the inner and the outer circumferences.

19 Claims, 8 Drawing Sheets

⟵ : direction of slipping

METHOD FOR FORMATTING AN OPTICAL RECORDING MEDIUM

BACKGROUND OF THE INVENTION

1. Field of the Invention

The present invention relates to a rewritable optical recording medium, and a method for formatting the same.

2. Background of the Invention

In general, optical recording media may be classified into a ROM type for read only, a WORM type for writing once, and a rewritable type for repetitive writing. In rewritable optical recording media, i.e., optical disks, which are rewritable freely and repetitively, there are CD-RW (Rewritable Compact Disc), and rewritable digital versatile discs (DVD-RAM, DVD-RW). In those rewritable optical disks, information writing/reading thereto/therefrom is repetitively performed due to the nature of use of the optical disk. The repetitive writing and reading of information causes a mixing ratio of a recording layer mixture, provided for recording the information, to change from an initial mixing ratio. This change leads to a loss of initial properties of the mixture, which causes errors during writing/reading information, termed degradation. Areas of degradation are turned up as defective areas when formatting, reading, or writing to the optical disk is carried out.

Figure 1:
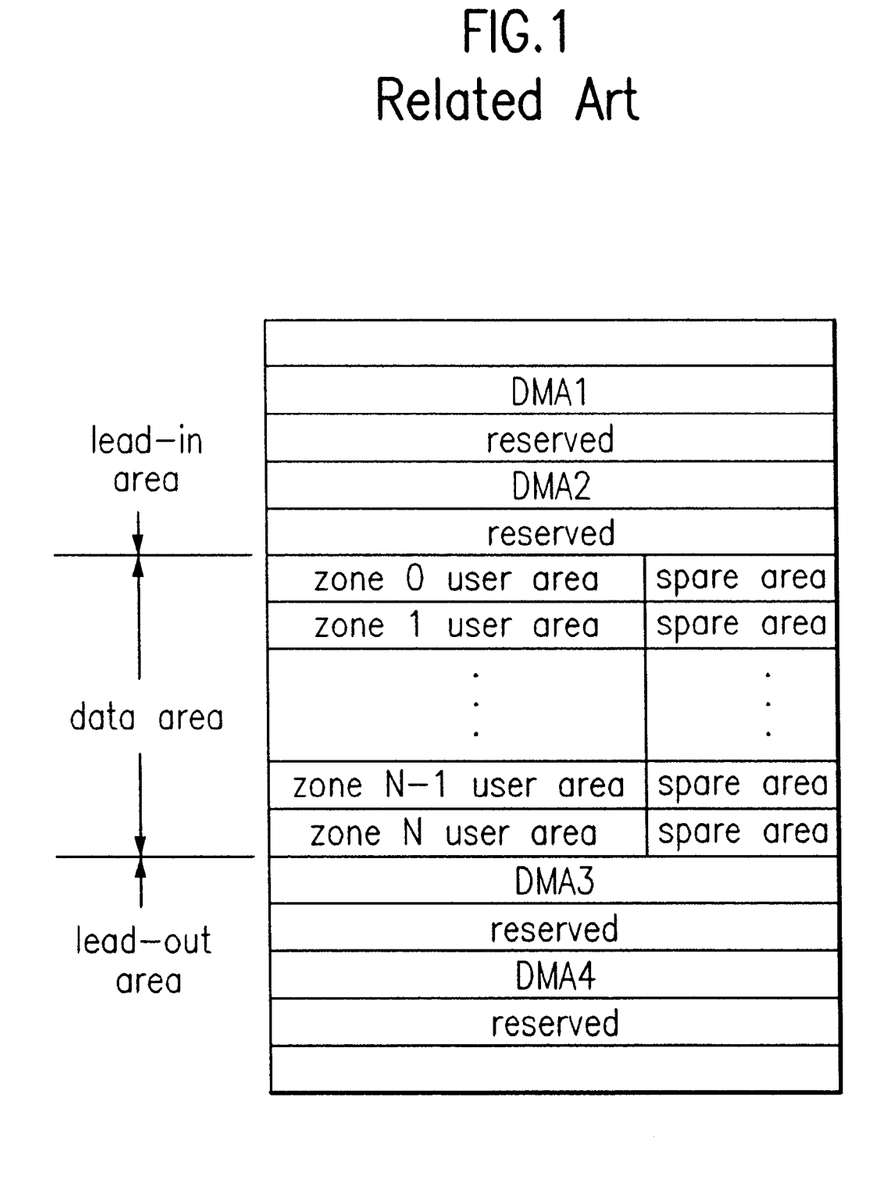
FIG. 1 illustrates an architecture of a related art optical disk having spare areas assigned in zones.

Other than such degradation, defective areas of the rewritable optical disk are caused by scratches on a surface, dust, and/or production defects. Therefore, in order to prevent writing/reading data to/from the defective areas by the foregoing, management of the defective areas is required. To do this, as shown in FIG. 1, DMAs (Defect Management Areas) are provided in a lead-in area and in a lead-out area of the optical recording medium for managing the defective areas of the optical recording medium. Also, data areas are managed in zones (or groups), each zone having a user area for use in actual writing of data and a spare area for use in a case of defect occurrence in the user area. In general, there are four DMAs provided in one disk (for example, a DVD-RAM)—two in the lead-in area and two in the lead-out area. As management of the DMAs are important, the same data is repeatedly written in the four DMAs for protection of data. Each DMA has two blocks having 32 sectors in total, i.e., one block has 16 sectors. Each DMA has a PDL (Primary Defect List) which is a primary data storage and an SDL (Secondary Defect List) which is a secondary data storage.

In general, the PDL stores entries of defects that occurred during fabrication of the disk, as well as all defective sectors identified in initializing (and re-initializing) of the disk. Each entry in the PDL has an entry type and a sector number of a defective sector. The SDL, listed in block units, stores entries of defective areas that occurred after initializing, or defective areas which can not be listed on the PDL during initializing. Each SDL entry has an area for storing a sector number of a first sector of a defective block having a defective sector therein. Each SDL entry also has an area for storing a sector number of a first sector of a replacement block for replacing the block containing the defective sector. The defective areas (i.e., defective sectors or defective blocks) in the data area are replaced by good areas, according to a slipping replacement algorithm or linear replacement algorithm.

Figure 2A:
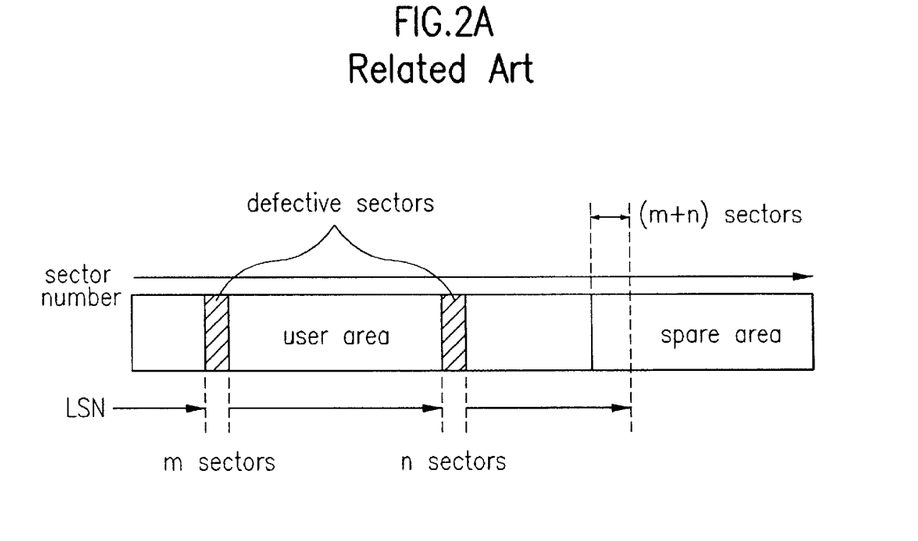
FIG. 2A illustrates a related art slipping replacement.

Referring to FIG. 2A, in the slipping replacement when a defective area is listed on the PDL, if the defective sector is present in the user area on which data is to be written, the defective sector is skipped. The defective sector is replaced with a good sector next to the defective sector when writing the data. The user area in which the data is being written is pushed backward to occupy the spare area by as many sectors as the skipped defective sectors. That is, as much spare area is assigned to the user area as corresponds to the skipped sectors. For example, if there are two defective sectors listed on the PDL, the user area in which the data will be written is pushed backward up to two sectors of the spare area.

Figure 2B:
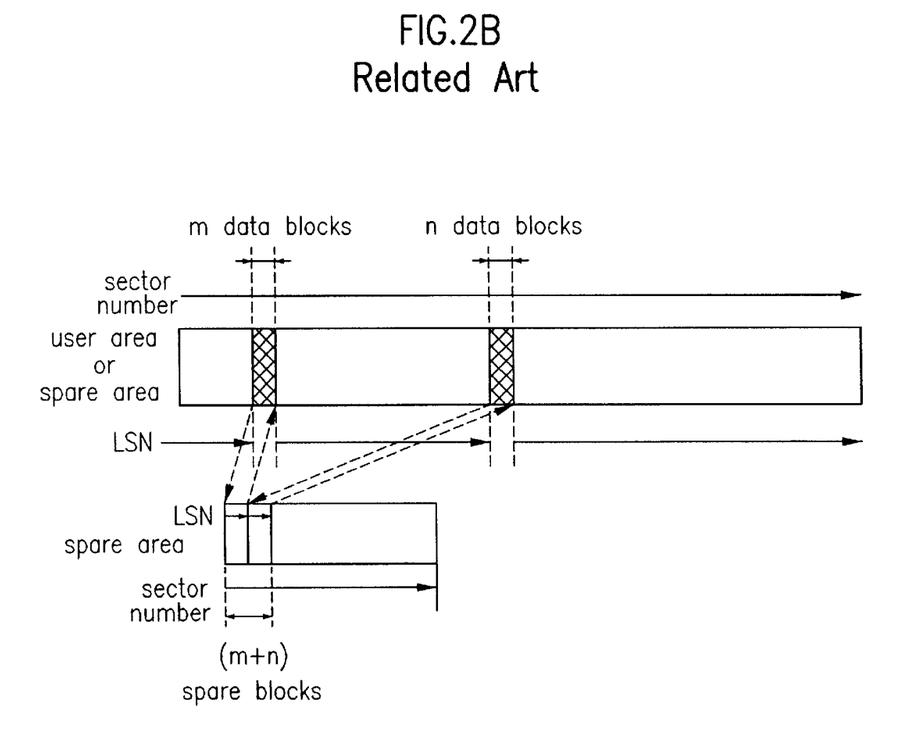
FIG. 2B illustrates a related art linear replacement.

Referring to FIG. 2B, in the linear replacement when a defective area is listed on the SDL, if a defective block listed on the SDL is present in the user area, the defective block is replaced with a corresponding block in the spare area when writing the data.

Figure 3A:
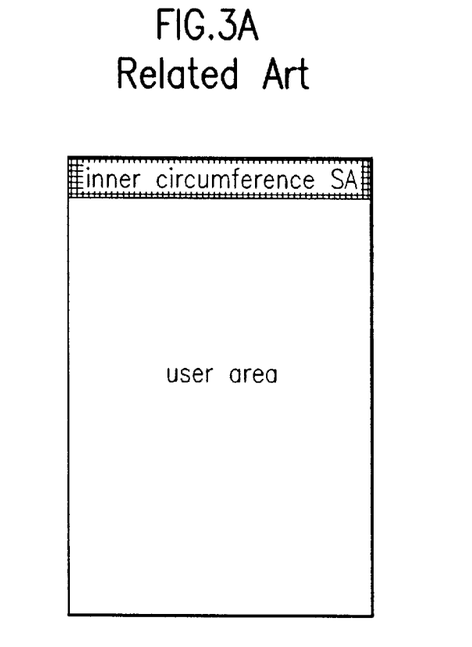
FIG. 3A illustrates an architecture of a related art optical disk having a spare area assigned to an inner circumference of a data area.
Figure 3B:
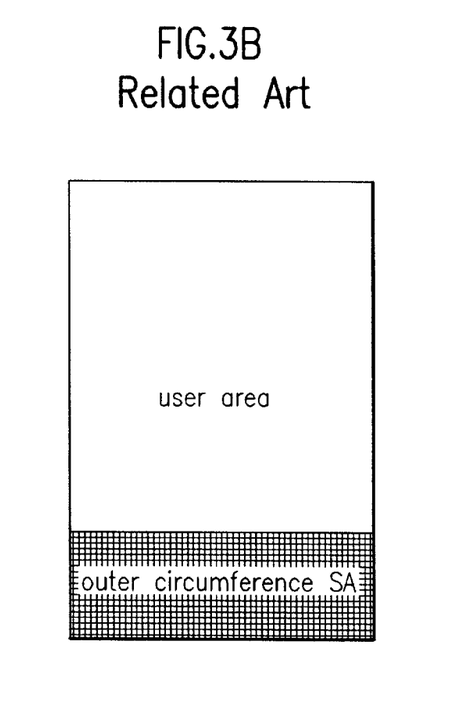
FIG. 3B illustrates an architecture of a related art optical disk having a spare area assigned to an outer circumference of a data area.
Figure 3C:
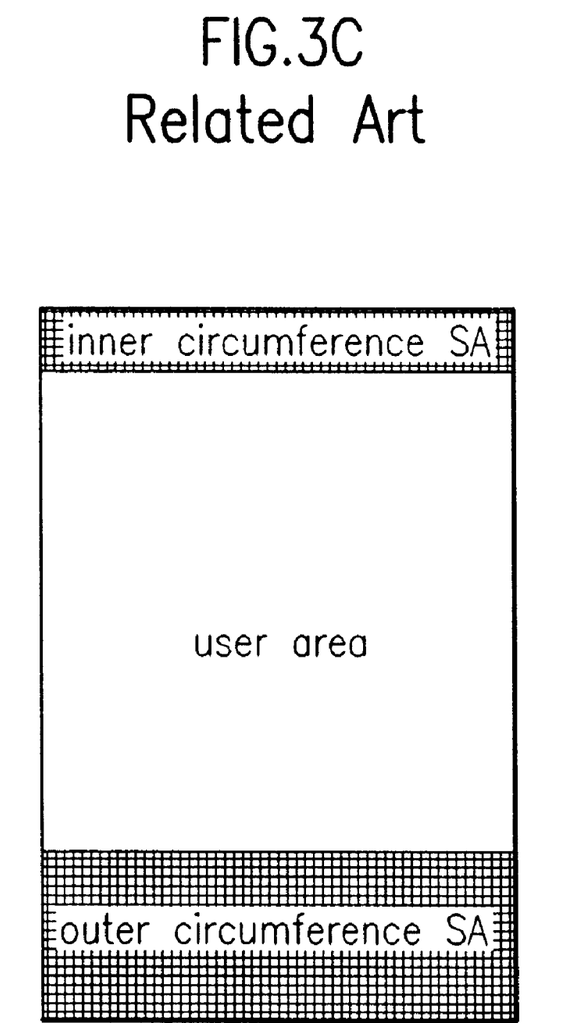
FIG. 3C illustrates an architecture of a related art optical disk having spare areas assigned to inner and outer circumferences of a data area.

Besides the method of assigning the spare area as shown in FIG. 1, there are other methods for assigning the spare area either to any one zone of the data area, or a portion of the data area. Of the methods for assigning the spare area to one portion of the data area, there are methods for assigning the spare area to a top, i.e., only to an inner circumference of the data area in the initial formatting as shown in FIG. 3A, to a bottom, i.e., only to an outer circumference as shown in FIG. 3B, or to an inner and an outer circumferences as shown in FIG. 3C. For convenience of explanation, the spare area assigned to the inner circumference is called an inner circumference spare area, and the spare area assigned to the outer circumference is called an outer circumference spare area. The user area is the remaining data area after the inner spare area, the outer spare area, or the inner and the outer spare areas are excluded. In this instance, no LSN (Logical Sector Number) is given to the spare area assigned in a process of initial formatting. When only the inner spare area or the outer spare area is assigned during initial formatting, if the spare area assigned becomes full, another spare area may be assigned to an opposite side as necessary. In such case, both the inner spare area and the outer spare area are present as shown in FIG. 3C.

Figure 4:
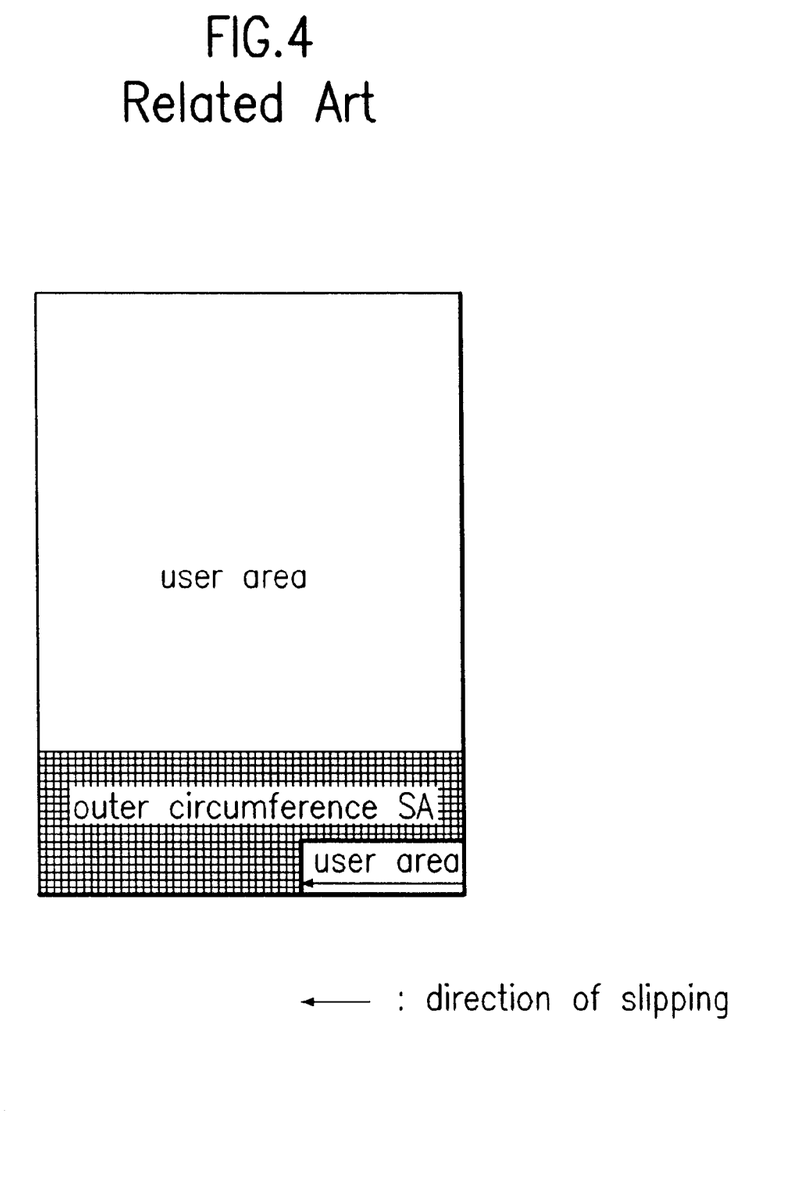
FIG. 4 illustrates a related art in which an outer circumference spare area is slipped in a reverse order.

Provided defective sectors are listed on the PDL during initializing or re-initializing, a recording capacity is correspondingly reduced, since no data is written on the defective sectors. The user area slips into the spare area as many sectors as the defective sectors listed on the PDL to maintain an initial data recording capacity. That is, there is a change in the user area. However, there is no definition of how to make the slipping replacement in the spare area when the spare area is assigned both to the inner circumference and the outer circumference of the data area. If the slipping is conducted in a reverse order in the outer circumference spare area, the data being written is separated, i.e., becomes discontinuous, as shown in FIG. 4. The outer spare area is assigned to the user area in a reverse order, which makes realtime continuous data writing difficult. As shown in FIG. 1, when the spare area is assigned in zones, realtime continuous data writing is difficult, because the spare area is present between zones. Discontinuity of the user area, whatever the cause, is an obstacle to the realtime writing.

SUMMARY OF THE INVENTION

Accordingly, the present invention is directed to an optical recording medium and a method for formatting the same that substantially obviates one or more of the problems due to limitations and disadvantages of the related art.

An object of the present invention is to provide an optical recording medium which can always maintain continuity of a user area regardless of initializing.

Another object of the present invention is to provide a method for formatting an optical recording medium, in which slipping is conducted in a direction such that continuity of a user area is maintained during initializing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for formatting an optical recording medium, the optical recording medium having a user area and a spare area, includes subjecting the spare area to slipping replacement in a reverse order if the spare area is located at an inner circumference of the user area; and subjecting the spare area to slipping replacement in a forward order if the spare area is located at an outer circumference of the user area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. The present invention provides a reverse order slipping replacement in an inner spare area and a forward order slipping replacement in an outer spare area, for securing the continuity of a user area.

Figure 5A:
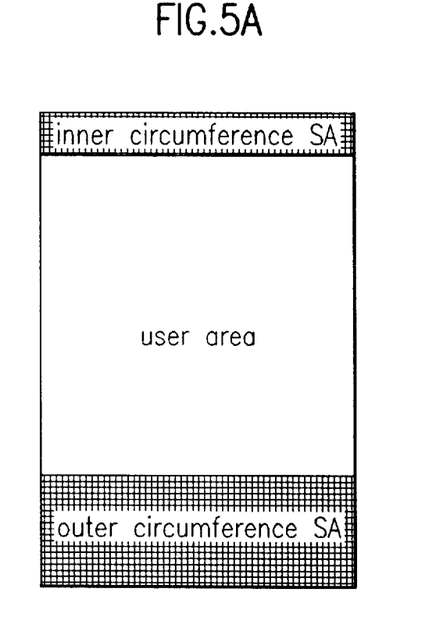
FIG. 5A illustrates an architecture of an optical disk in which spare areas are assigned to inner and outer circumferences of data area according to the present invention.
Figure 5B:
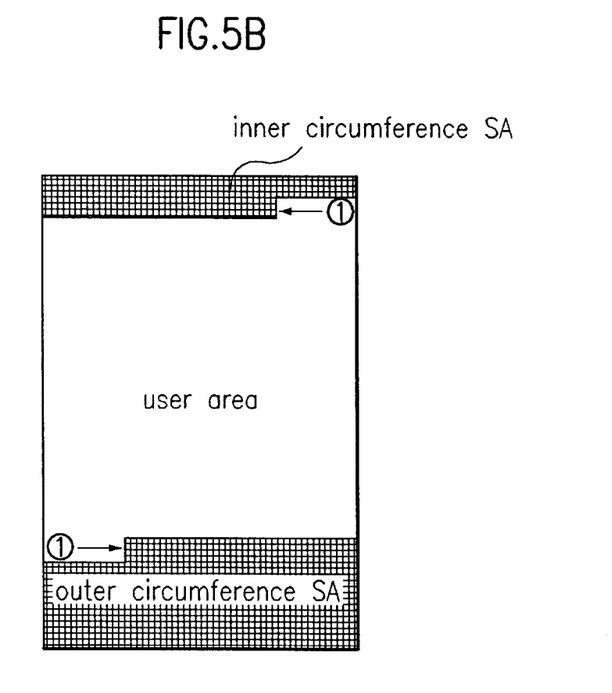
FIG. 5B illustrates an example of slipping inner and outer circumference spare areas at the same time in an optical disk according to the present invention.

FIG. 5A illustrates an architecture of an optical disk in which spare areas are assigned both to inner and outer circumferences of data area according to an embodiment of the present invention. FIG. 5B illustrates an example of slipping inner and outer circumference spare areas at the same time in the optical disk of FIG. 5A according to an embodiment of the present invention.

Referring to FIG. 5B, when initializing, the inner circumference spare area is slipped in a reverse order and an outer circumference spare area is slipped in a forward order. However, since linear replacement does not influence the continuity/discontinuity of the user area, conducting of linear replacement either in reverse or forward order makes no difference. For example, if the defective sectors on the PDL number 100, 50 of the 100 defective sectors may be slipped to the inner circumference spare area, and the remaining 50 defective sectors may be slipped to the outer circumference spare area. If only one of the spare areas should be activated when both the inner and outer circumference spare areas are assigned, the slipping occurs to either of the two spare areas. Provided the spare area to which the slipping occurs is consumed fully, then slipping to the other spare area occurs.

Figure 5C:
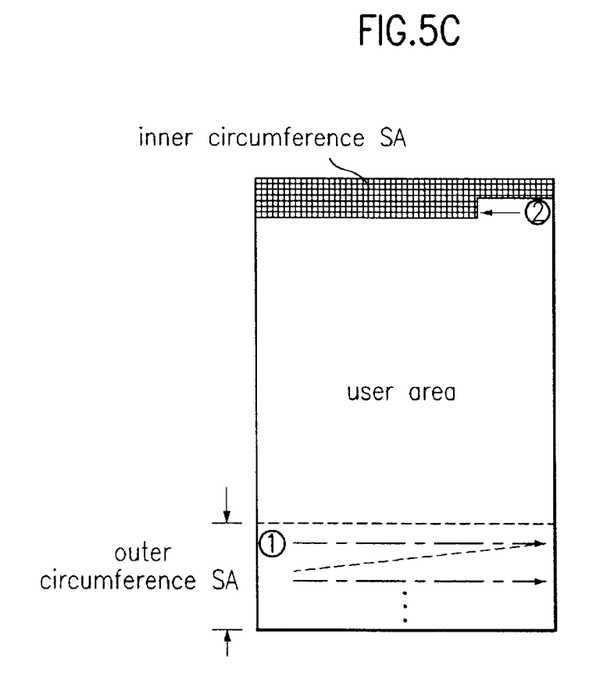
FIG. 5C illustrates an example of slipping an inner circumference spare area for the first time and slipping an outer circumference spare area for the second time in an optical disk of the present invention.
Figure 5D:
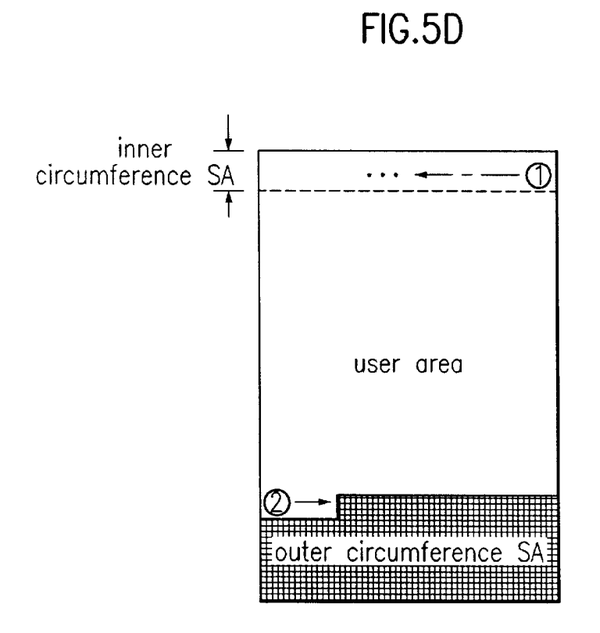
FIG. 5D illustrates an example of slipping an inner circumference spare area for the first time and slipping an outer circumference spare area for the second time in an optical disk of the present invention.

FIG. 5C illustrates a case when an inner circumference spare area is slipped in a reverse order as shown at $\hat{2}$ after the outer circumference spare area shown in dotted line is fully assigned to the user area by the slipping shown at $\hat{1}$. FIG. 5D illustrates a case when an outer circumference spare area is slipped in a forward order as shown at $\hat{2}$ after the inner circumference spare area shown in dotted line is fully assigned to the user area by the slipping shown at $\hat{1}$. It is more effective that the slipping methods in FIGS. 5C and 5D are applied when at least one spare area is active, and that the slipping method in FIG. 5B is applied when both of the two spare areas are active.

Figure 6A:
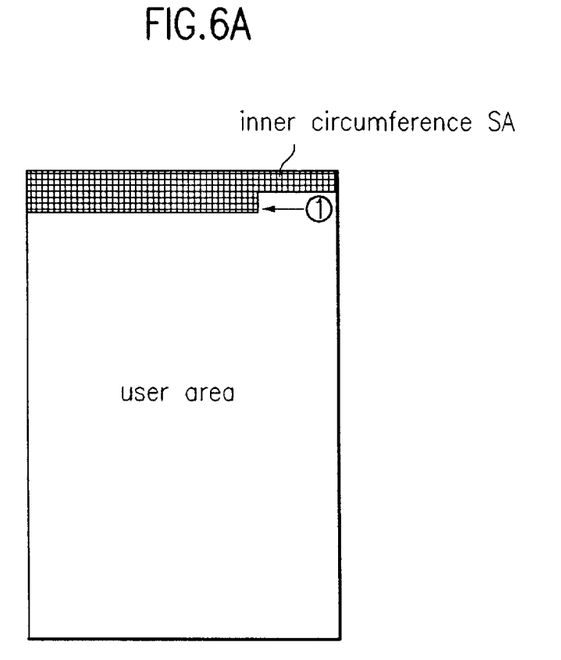
FIG. 6A illustrates an example of slipping an inner circumference spare area in an optical disk of the present invention; and, FIG. 6B illustrates an example of slipping an outer circumference spare area in an optical disk of the present invention.
Figure 6B:
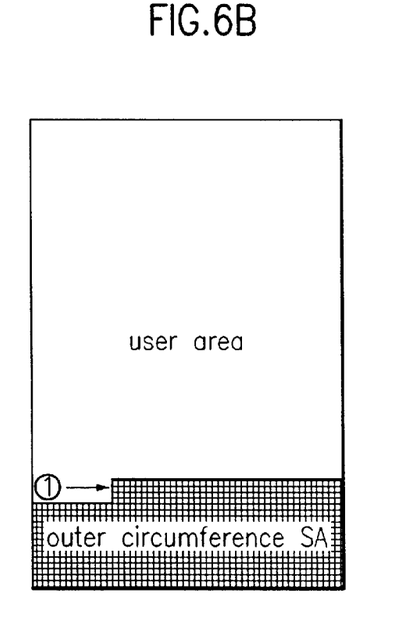

When only the inner circumference spare area is assigned, slipping is conducted in a reverse order during initializing as shown in FIG. 6A. When only the outer circumference spare area is assigned, slipping is conducted in a forward order while initializing as shown in FIG. 6B. Thus, the present invention facilitates slipping in a direction such that continuity of the user area is secured. Therefore, the optical disk having the spare area assigned in any one of FIGS. 3A, 3B and 3C can always secure a continuity of the user area regardless of the manner of initializing.

As has been explained, the optical recording medium and the method for formatting the same facilitates realtime recording, because continuity of the user area data written thereon can be secured regardless of initializing by conducting slipping such that the user area is continuous. This method maintains a continuous user area on an optical disk having the spare area assigned to the inner circumference thereof, an optical disk having the spare area assigned to the outer circumference thereof, and an optical disk having the spare area assigned both to the inner and the outer circumferences thereof.

It will be apparent to those skilled in the art that various modifications and variations can be made in the optical recording medium and a method for formatting the same of the present invention without departing from the spirit or scope of the invention. Thus, it is intended that the present invention cover the modifications and variations of this invention provided they come within the scope of the appended claims and their equivalents.

What is claimed is:

1. A method for formatting an optical recording medium, the optical recording medium having a user area and a spare area, the method comprising:

subjecting the spare area to slipping replacement in a reverse order if the spare area is located at an inner circumference of the user area.

2. The method of claim 1, further comprising:

subjecting the spare area to slipping replacement in a forward order if the spare area is located at an outer circumference of the user area.

3. The method of claim 2, wherein the spare area is located at both of the outer circumference and the inner circumference of the user area.

4. The method of claim 3, wherein the subjecting steps are performed substantially at the same time.

5. The method of claim 3, wherein the subjecting the spare area to slipping replacement in a forward order step does not occur until the spare area located at the inner circumference of the user area has been filled by the subjecting the spare area to slipping replacement in a reverse order step.

6. The method of claim 3, wherein the subjecting the spare area to slipping replacement in a reverse order step does not occur until the spare area located at the outer circumference of the user area has been filled by the subjecting the spare area to slipping replacement in a forward order step.

7. The method of claim 2, wherein the spare area is located at one of the outer circumference and the inner circumference of the user area.

8. The method of claim 2, wherein the inner and outer circumferences of the user area represent inner and outer tracks of the optical recording medium, respectively.

9. The method of claim 2, wherein the subjecting the spare area to slipping replacement in a forward order step includes using the spare area in an outwardly-moving direction, starting with a sector closest to the outer circumference of the user area and moving in a counterclockwise direction.

10. The method of claim 1, wherein the subjecting the spare area to slipping replacement in a reverse order step includes using the spare area in an inwardly-moving direction, starting with a sector closest to the inner circumference of the user area and moving in a clockwise direction.

11. A method for formatting an optical recording medium, the optical recording medium having a continuous user area, a first spare area at an inner circumference of the user area, and a second spare area at an area outer circumference of the user area, the method comprising:

converting the first spare area to the user area such that continuity of the user area is maintained.

12. The method of claim 11, wherein the converting step includes:

converting the first spare area to the user area in a reverse order.

13. The method of claim 12, wherein the converting step includes:

converting the second spare area to the user area in a forward order.

14. The method of claim 13, wherein the converting the first spare area and the converting the second spare area steps occur substantially at the same time.

15. The method of claim 13, wherein the converting the first spare area step occurs after the second spare area has been converted to the user area.

16. The method of claim 13, wherein the converting the second spare area step occurs after the first spare area has been converted to the user area.

17. The method of claim 13, wherein the converting the second spare area in a forward order step includes converting the second spare area to the user area in an outwardly-moving direction, starting with a sector closest to the outer circumference of the user area and moving in a counter-clockwise direction.

18. The method of claim 12, wherein the converting the first spare area in a reverse order step includes converting the first spare area to the user area in an inwardly-moving direction, starting with a sector closest to the inner circumference of the user area and moving in a clockwise direction.

19. The method of claim 11, wherein the inner and outer circumferences of the user area represent inner and outer tracks of the optical recording medium, respectively.

* * * * *